United States Patent
Fitzpatrick et al.

[11] Patent Number: 5,875,261
[45] Date of Patent: Feb. 23, 1999

[54] METHOD OF AND APPARATUS FOR OPTICAL CHARACTER RECOGNITION BASED ON GEOMETRIC AND COLOR ATTRIBUTE HYPOTHESIS TESTING

[75] Inventors: Greg Fitzpatrick, Irving; William J. Johnson, Flower Mound; Robert S. Keller, Grapevine; Marvin L. Williams, Lewisville, all of Tex.

[73] Assignee: International Business Machines Corporation, Armonk, N.Y.

[21] Appl. No.: 812,249

[22] Filed: Dec. 20, 1991

[51] Int. Cl.⁶ .................................................... G06K 9/62
[52] U.S. Cl. ............................................. 382/165; 382/227
[58] Field of Search .............................. 382/17, 39, 162, 382/165, 227, 228; 101/211; 395/109, 110, 117, 131, 150; 283/114, 901; 235/469; 358/79, 539; 380/54; 345/431

[56] References Cited

U.S. PATENT DOCUMENTS

| | | | |
|---|---|---|---|
| 2,978,675 | 4/1961 | Highleyman | 382/39 |
| 3,938,088 | 2/1976 | Clark | 382/17 |
| 3,990,043 | 11/1976 | Clark | 382/17 |
| 4,009,466 | 2/1977 | Clark | 382/17 |
| 4,829,568 | 5/1989 | Clark et al. | 380/23 |
| 4,831,657 | 5/1989 | Casey et al. | 382/39 |
| 4,876,735 | 10/1989 | Martin et al. | 382/39 |
| 5,257,323 | 10/1993 | Melen et al. | 382/39 |

OTHER PUBLICATIONS

E. J. Supernowicz, and M. J. Vogel "Character Sensing Device" *IBM Technical Disclosure Bulletin*, vol. 2, No. 3, pp. 91–92 Oct., 1959.

G. Pavanati "Color Coded Kanji Pattern Recognition" *IBM Technical Disclosure Bulletin*, vol. 19, No. 6, pp. 2123–2124, Nov., 1976.

J. M. White, and G. D. Rohrer "Image Thresholding for Optical Character Recognition and Other Applications Requiring Character Image Extraction" *IBM Journal of Research and Development*, vol. 27, No. 4, pp. 400–411, Jul., 1983.

*Primary Examiner*—Andrew W. Johns
*Attorney, Agent, or Firm*—Edward H. Duffield

[57] ABSTRACT

Method of, and apparatus for, optical character recognition of predominate and non-predominate color coded characters based on hypothesis testing utilizing both geometric optical character recognition and color coded optical character recognition techniques. In this hypothesis testing technique, geometric OCR is used to generate a null hypothesis that a target character has been recognized, and an alternative hypothesis that the target character has not been recognized. Color coded OCR is used to select either the null hypothesis or the alternative hypothesis. Alternatively, the roles of geometric OCR and color coded OCR may be reversed such that color coded OCR is used for hypothesis generation, and geometric OCR is used for hypothesis selection.

15 Claims, 3 Drawing Sheets

METHOD OF AND APPARATUS FOR OPTICAL CHARACTER RECOGNITION BASED ON GEOMETRIC AND COLOR ATTRIBUTE HYPOTHESIS TESTING

CROSS REFERENCES TO RELATED APPLICATIONS

This application is related in subject matter to the following applications filed concurrently herewith and assigned to a common assignee:

Application Ser. No. 07/812,178 filed by G. P. Fitzpatrick entitled "Method of and Apparatus for Producing Predominate and Non-predominate Color Coded Characters for Optical Character Recognition" (IBM Docket DA9-91-082) now U.S. Pat. No. 5,406,640.

Application Ser. No. 07/812,179 filed by G. P. Fitzpatrick entitled "Method of and Apparatus for Recognizing Predominate and Non-predominate Color Coded Characters for Optical Character Recognition" (IBM Docket DA9-91-090) now U.S. Pat. No. 5,396,564.

The foregoing copending applications are incorporated herein by reference.

TECHNICAL FIELD OF THE INVENTION

This invention relates in general to optical character recognition, and in particular to a method of, and apparatus for, optical character recognition of predominate and non-predominate color coded characters based on hypothesis testing utilizing both geometric optical character recognition and color coded optical character recognition techniques.

BACKGROUND OF THE INVENTION

Conventional optical character recognition (OCR) techniques fall into two major categories. The first technique is geometric OCR. The second technique is color coded OCR.

Geometric OCR attempts to recognize a character based on the character's shape or the geometric representation of a set of pixels or dots. A character as used herein is meant to include a printed or written symbol which can be recognized by an OCR device or a human reader. The character can be an alphabetical symbol or an icon. Furthermore, the term pixel and dot will be used interchangeably to describe a distinguishable point recognizable by an OCR device. In such a geometric OCR approach, color is used only to define the shape of a character. Even if characters are represented by multiple colors, the multiple colors are converted to either black or a gray scale before shape analysis. Although the geometric OCR approach can provide a recognition accuracy as high as 99.5%, character recognition errors still occur due to character shape defects and character shape variations. Such character shape defects may take the form of smudged characters or improperly formed characters. Such character shape variations may take the form of character fonts other than those character fonts for which the OCR device is designed to recognize.

The second technique of color coded OCR attempts to recognize a character based on the character's color. In such an approach, color is used not only to indicate the shape of a character, but also to indicate the identity of the character. For example, "a" is printed red, "b" is printed blue, and "c" is printed yellow. Color coding OCR is not subject to the shape processing errors of geometric OCR as it does not perform shape processing. However, color coded OCR may be subject to color processing errors. Such color processing errors may take the form of ink color shifts, improper color density, improper color intensity, or color scanner misalignment.

Thus, there is a need for an OCR approach which can substantially increase the accuracy rate of optical character recognition techniques while overcoming both the shape processing error deficiency of geometric OCR and the color processing error deficiency of color coded OCR.

SUMMARY OF THE INVENTION

With the proliferation of color scanners and color printers and the wide variety of optical devices which are color sensitive, a new approach can be applied to character recognition devices and programs. The invention disclosed herein comprises a method of, and apparatus for, utilizing both a shape attribute of a character and a color attribute of the character to recognize the character being examined by an OCR device. The present invention provides higher optical character recognition accuracy rates than either conventional geometric OCR or conventional color coded OCR. These higher OCR accuracy rates are achieved by using color coded OCR processing to avoid the shape processing errors of geometric OCR, and by using geometric OCR to avoid the color processing errors of color coded OCR.

In accordance with one aspect of the present invention, optical character recognition by using both geometric OCR and color coded OCR to recognize a character is provided.

Another aspect of the present invention is to provide optical character recognition by a hypothesis testing technique. In this hypothesis testing technique, geometric OCR is used to generate a null hypothesis that a target character has been recognized, and an alternative hypothesis that the target character has not been recognized. Color coded OCR is used to select either the null hypothesis or the alternative hypothesis. Alternatively, the roles of geometric OCR and color coded OCR may be reversed such that color coded OCR is used for hypothesis generation, and geometric OCR is used for hypothesis selection.

Another aspect of the present invention is to provide optical character recognition by a hypothesis testing technique wherein the hypothesis selection is based on a probability calculated by the OCR technique used for the hypothesis selection.

Another aspect of the present invention is to provide the hypothesis selection based on a relationship between a threshold and the probability calculated by the OCR technique used for the hypothesis selection.

The present invention has the advantage of providing higher optical character recognition accuracy rates.

BRIEF DESCRIPTION OF THE DRAWINGS

For a more complete understanding of the present invention and the advantages thereof, reference is now made to the Detailed Description in conjunction with the attached Drawings, in which.

DETAILED DESCRIPTION OF THE INVENTION

Figure 1:
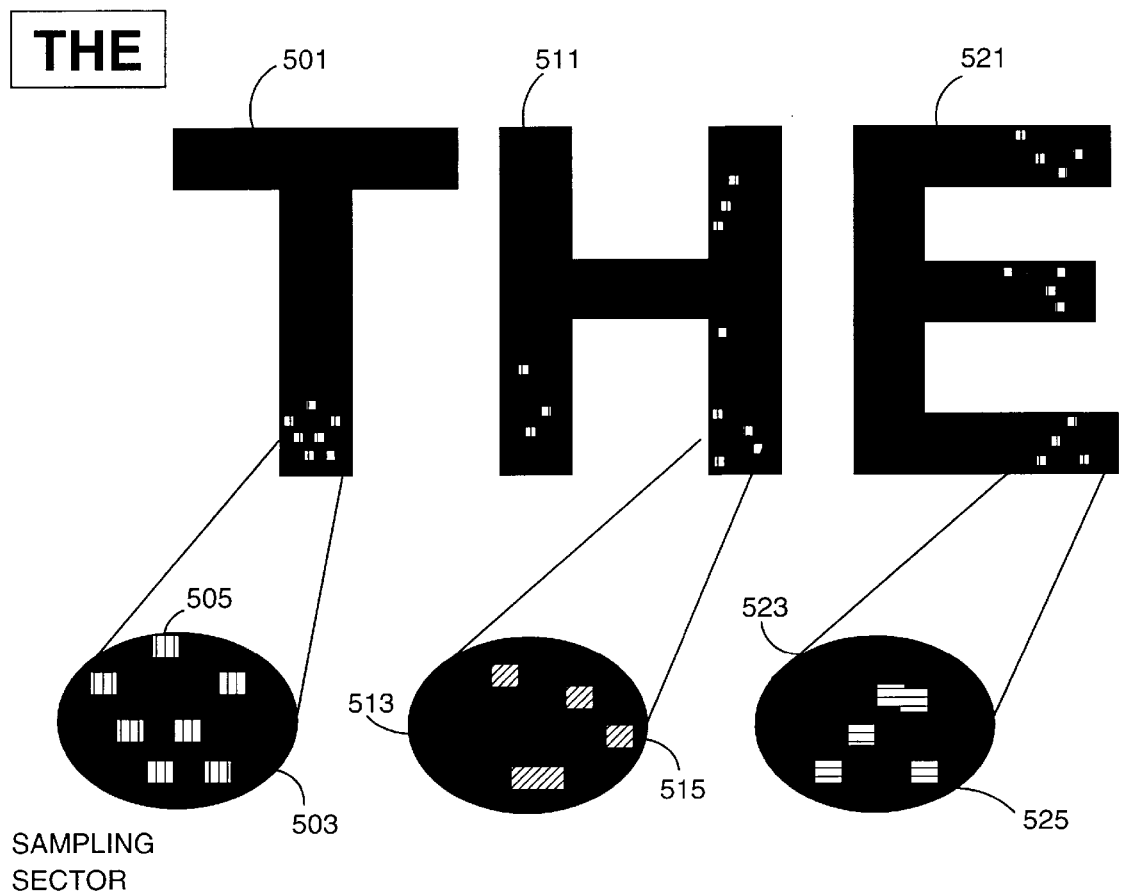
FIG. 1 illustrates a color coded technique of representing characters in accordance with the present invention.

Referring first to FIG. 1, a representation of the word "THE" composed of the three characters "T" 501, "H" 511, and "E" 521 in accordance with the present invention is shown. In this predominate and non-predominate color coded technique, each character is represented by a predominate color associated with the character and a non-predominate color associated with the character. The predominate color is readily distinguishable by humans. The non-predominate color is associated, interlaced, intermingled, or embedded with the predominate color. The non-predominate color is non-distracting to humans, but distinguishable by a color scanner. For example, the bodies of the characters "T" 501, "H" 511, and "E" 521 are all composed of a predominate color black. The black predominate color is distinguishable by a human reader, and the characters appear black to a human reader. The exploded view 503 of a portion of the body of the character "T" 501 illustrates a non-predominate color 505 which may comprise red associated with the character "T" 501. The non-predominate color 505 is non-distracting to humans, but distinguishable by a color scanner. The non-predominate color 505 is also associated, interlaced, intermingled, or embedded with the predominate color black. The exploded view 513 of a portion of the body of the character "H" 511 illustrates a non-predominate color 515 which may comprise brown associated with the character "H" 511. The non-predominate color 515 is non-distracting to humans, but distinguishable by a color scanner. The non-predominate color 515 is also associated, interlaced, intermingled, or embedded with the predominate color black. The exploded view 523 of a portion of the body of the character "E" 521 illustrates a non-predominate color 525 which may comprise blue associated with the character "E" 521. The non-predominate color 525 is non-distracting to humans, but distinguishable by a color scanner. The non-predominate color 525 is also associated, interlaced, intermingled, or embedded with the predominate color black.

Figure 2:
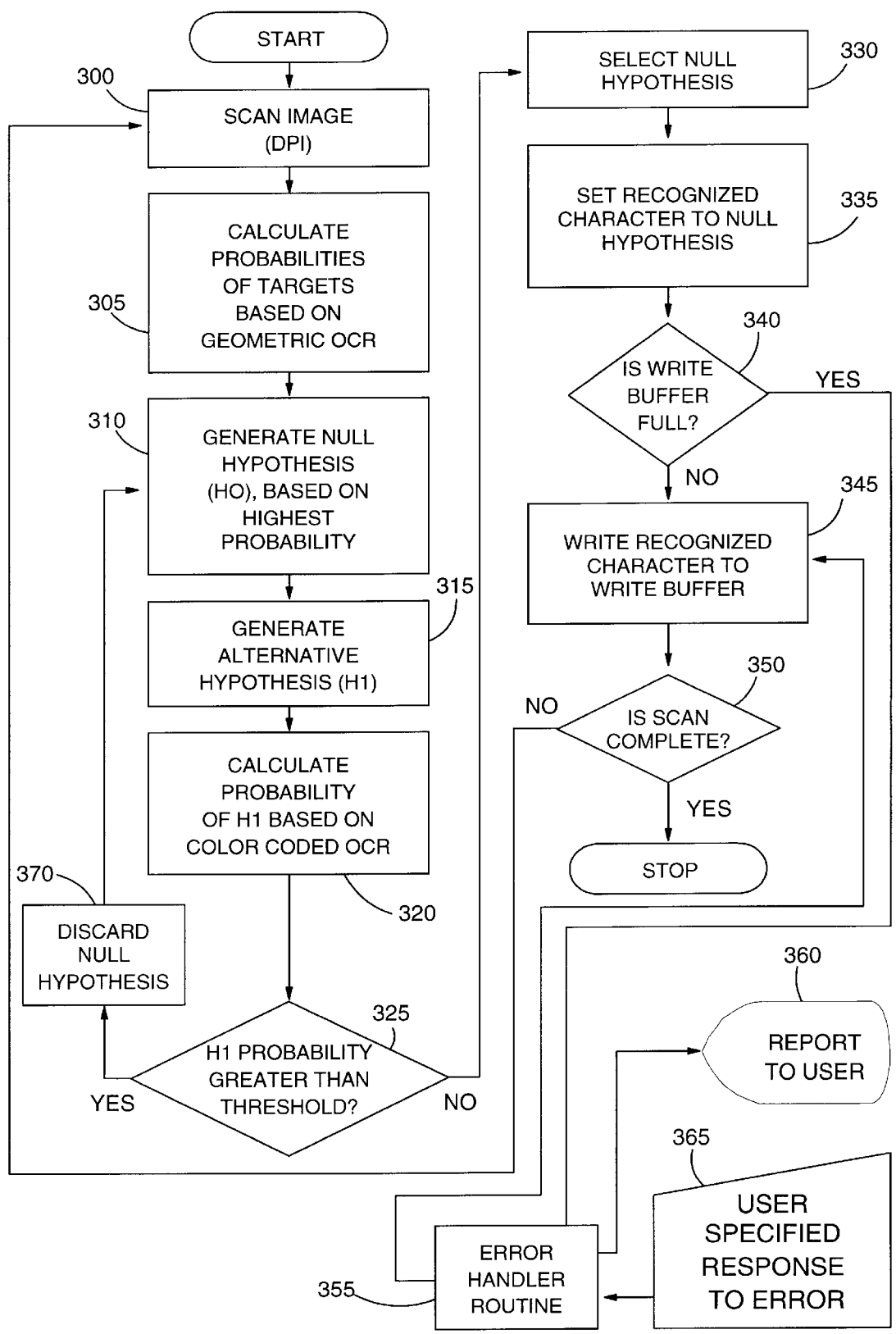
FIG. 2 is a flow chart illustrating the operations preferred in carrying out the present invention.

Referring next to FIG. 2, a flowchart illustrating operations preferred in carrying out the present invention is shown. In the flowchart, the graphical conventions of a diamond for a test or decision and a rectangle for a process or function are used. These conventions are well understood by those skilled in the art, and the flowchart is sufficient to enable one of ordinary skill to write code in any suitable computer programming language. As shown in FIG. 2, after the start of the program, process block 300 scans, by means of a color scanner, a portion of an image which may or may not contain recognizable characters. Thereafter, process block 305 calculates, based on geometric optical character recognition, the probability of an unrecognized character within the portion of the image being a particular target character. For example, process block 305 may calculate that there is a 90% probability that the unrecognized character is an "A." Process block 305 further calculates these probabilities for the other potential target characters. For example, process block 305 may further calculate that there is a 30% probability that the unrecognized character is an "B," 5% probability that the unrecognized character is a "C", etc.

Thereafter, process block 310 generates, based on geometric optical character recognition processing, a null hypothesis based on the highest probability calculated by such geometric optical character recognition processing. Following the above example, process block 310 generates a null hypothesis that the character "A" is recognized. This is based on "A" having the highest probability of 90%.

Thereafter, process block 315 generates an alternative hypothesis. Following the example, process block 315 generates an alternative hypothesis that "A" is not recognized.

Thereafter, process block 320 calculates, based on color coded optical character recognition, the probability of the alternative hypothesis. For example, process block 305 may calculate that there is a 1% probability that the unrecognized character is not an "A."

Thereafter, decision block 325 is used to determine whether or not the probability of the alternative hypothesis is greater than a threshold. Decision block 325 accepts the null hypothesis, unless there is evidence above the threshold in favor of the alternative hypothesis. Such threshold may be set at 90% to indicate that the null hypothesis is accepted, unless there is overwhelming evidence (90% or greater probability) in favor of the alternative hypothesis. If the probability of the alternative hypothesis is not greater than the threshold, then process block 330 selects the null hypothesis. Thereafter, process block 335 sets a Recognized Character Register equal to the target character identified by the null hypothesis. In the example, process block 335 sets the Recognized Character Register equal to "A". Thereafter, decision block 340 determines whether or not a write buffer is full. The write buffer is the buffer in which the program writes a sequence of recognized characters. If the write buffer is not full, then process block 345 writes the contents of the Recognized Character Register to the write buffer. Thereafter, decision block 350 determines whether or not a full image scan is complete. If a full image scan is complete, then the program stops.

Returning now to decision block 350, if a full image scan is not complete, then the program returns to process block 300 for further scanning.

Returning now to decision block 340, if the write buffer is full, then process block 355, which is an exception handler routine, processes the exception. A default action of process block 355 is to transfer the contents of the write buffer to an output file, and to clear the write buffer. Process block 355 may also report an exception to a user through output device 360. In lieu of the default action, process block 355 may execute a user specified response to an exception, such as designating the output file, as specified by the user through input device 365. Thereafter, the program returns to process block 345 for writing the recognized character to the write buffer.

Returning now to decision block 325, if the probability of the alternative hypothesis is greater than the threshold, then process block 370 selects the alternative hypothesis and discards the null hypothesis. In such case, decision block 325 rejects the null hypothesis as there is evidence above the threshold in favor of the alternative hypothesis. Thereafter, the program continues to process block 310 to generate another null hypothesis based on the highest probability after discarding the prior highest probability. Following the example, after the 90% "A" null hypothesis is discarded, the highest probability is the 30% probability that the unrecognized character is a "B".

Figure 3:
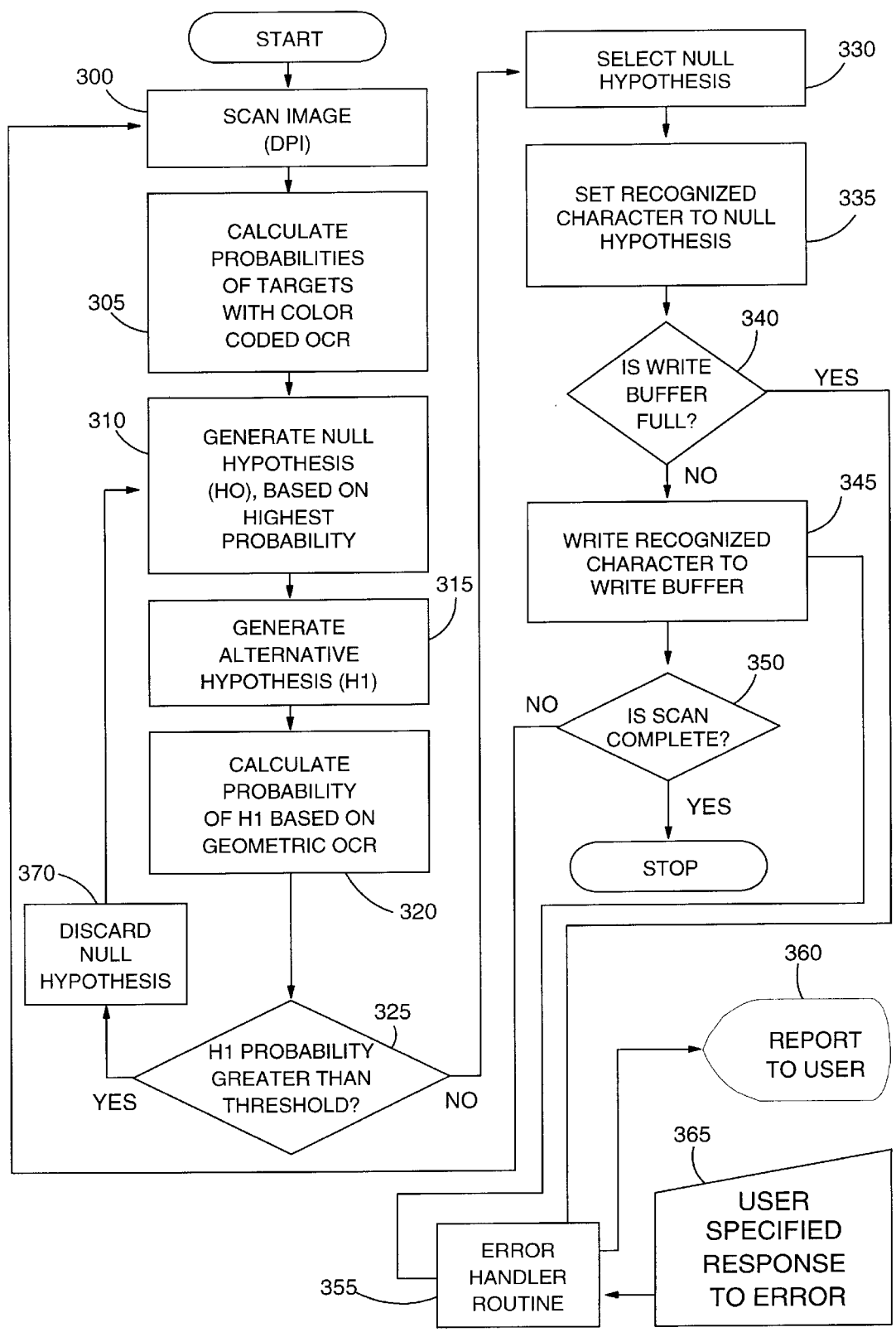
FIG. 3 is a flow chart illustrating the operations used in carrying out an alternative embodiment of the present invention.

Referring now to FIG. 3, a flowchart illustrating operations for an alternative embodiment for carrying out the present invention is shown. This alternative embodiment uses color coded OCR to generate a null hypothesis; whereas, the preferred embodiment illustrated in FIG. 2 uses geometric OCR to generate the null hypothesis. Furthermore, this alternative embodiment uses geometric OCR to calculate a probability of an alternative hypothesis; whereas, the preferred embodiment illustrated in FIG. 2 uses color coded OCR to calculate the probability of the alternative hypothesis. The sequence of operations for the preferred embodiment illustrated in FIG. 2 and the sequence of operations for the alternative embodiment illustrated in FIG. 3 are identical, except for process blocks 305, 310, and 320. The purpose of process blocks 305, 310, and 320 is to provide the null hypothesis generation and the alternative hypothesis probability calculation.

Referring now to process block 305 of FIG. 3, process block 305 calculates, based on color coded optical character recognition, the probability of an unrecognized character within the portion of the image being a particular target character. For example, process block 305 may calculate that there is a 90% probability that the unrecognized character is an "A." Process block 305 further calculates these probabilities for the other potential target characters. For example, process block 305 may further calculate that there is a 30% probability that the unrecognized character is an "B," 5% probability that the unrecognized character is a "C", etc.

Thereafter, process block 310 generates, based on color coded optical character recognition processing, a null hypothesis based on the highest probability calculated by such color coded optical character recognition processing. Following the above example, process block 310 generates a null hypothesis that the character "A" is recognized. This is based on "A" having the highest probability of 90%.

Thereafter, process block 315 generates an alternative hypothesis. Following the example, process block 315 generates an alternative hypothesis that "A" is not recognized.

Thereafter, process block 320 calculates, based on geometric optical character recognition, the probability of the alternative hypothesis. For example, process block 305 may calculate that there is a 1% probability that the unrecognized character is not an "A."

Thereafter, the program continues to decision block 325 as illustrated in both FIG. 2 and FIG. 3.

Figure 4:
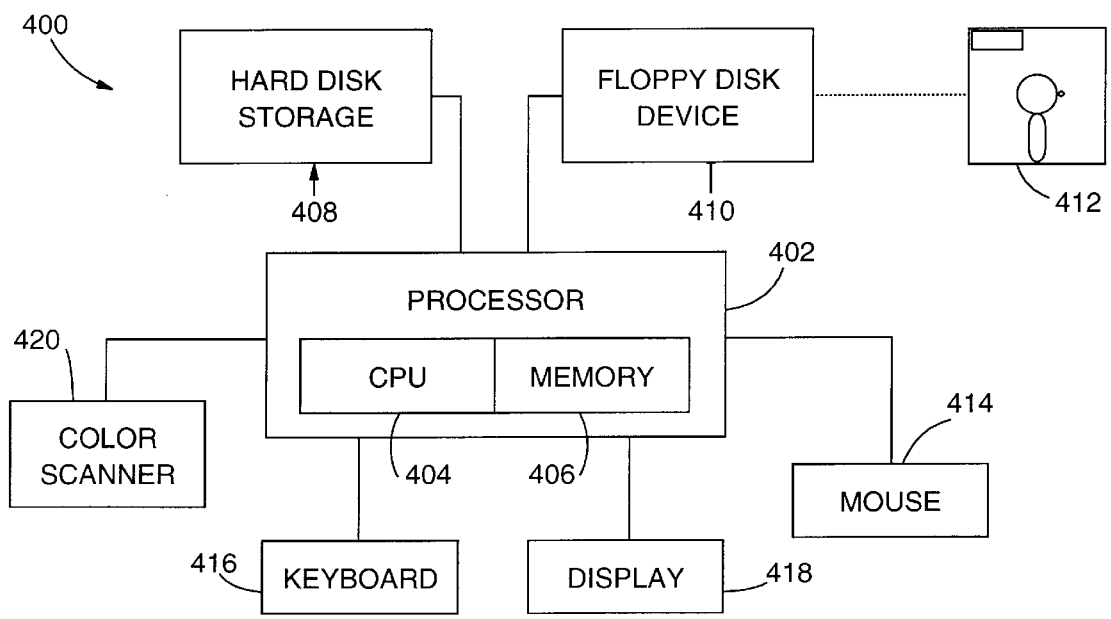
FIG. 4 is a block diagram of a computer system used in performing the method of the present invention and forming part of the apparatus of the present invention.

Referring now to FIG. 4, there is shown in block diagram form, a data processing system 400 according to the present invention. The data processing system 400 includes a processor 402, which includes a central processing unit (CPU) 404, and a memory 406. Additional memory, in the form of a hard disk file storage 408 and a floppy disk device 410, is connected to the processor 402. Floppy disk device 410 receives a diskette 412 which has computer program code recorded thereon that implements the present invention in the data processing system 400. The data processing system 400 includes user interface hardware, including a mouse 414 and a keyboard 416 for allowing user input to the processor 402 and a display 418 for presenting visual data to the user. The data processing system also includes a color scanner 420.

In one aspect of the present invention, the selection of the particular hypothesis, either null or alternate, is based on a relationship between the probability calculated and a threshold. Although the preferred embodiment describes selecting the alternative hypothesis if the probability is above a threshold, another embodiment provides that the null hypothesis is selected if the probability is greater than a threshold. The alternative hypothesis is selected if the probability is not greater than the threshold in this alternative embodiment.

Although the present invention has been particularly shown and described with reference to a preferred embodiment, it will be understood of those skilled in the art that various changes in form and detail may be made without departing from the spirit and the scope of the invention.

What we claim is:

1. A method of recognizing a color coded character, wherein said character comprises plural pixels which are of a first color, said first color pixels being predominate so as to allow humans to distinguish said character and a small amount of a second color associated with said character, said second color being non-predominate so as to be non-distracting to humans, but distinguishable by a color scanner, comprising the steps of:

processing said character in a first processing step by an optical character recognition means selected from an optical character recognition group consisting of geometric optical character recognition and non-predominate color coded optical character recognition; and processing said character in a second precessing step by an optical character recognition means from said optical character recognition group not selected in said first processing step.

2. The method of claim 1, wherein said first processing step further comprises:

generating a null hypothesis that a character is recognized and an alternative hypothesis that said character is not recognized, and wherein said second processing step further comprises:

selecting one hypothesis from a hypothesis group consisting of said null hypothesis and said alternative hypothesis.

3. The method of claim 2, wherein said step of selecting one hypothesis from a hypothesis group consisting of said null hypothesis and said alternative hypothesis, further comprises the steps of:

calculating, by said optical character recognition means from said optical character recognition group not selected in said first processing step, a probability of a hypothesis from said hypothesis group; and selecting one hypothesis from said hypothesis group consisting of said null hypothesis and said alternative hypothesis based on said probability.

4. The method of claim 3, wherein said step of selecting a hypothesis from said hypothesis group consisting of said null hypothesis and said alternative hypothesis based on said probability, further comprises the steps of:

selecting said alternative hypothesis if said probability is greater than a threshold; and selecting said null hypothesis if said probability is not greater than said threshold.

5. The method of claim 3, wherein said step of selecting a hypothesis from said hypothesis group consisting of said null hypothesis and said alternative hypothesis based on said probability, further comprises the steps of:

selecting said null hypothesis if said probability is greater than a threshold; and selecting said alternative hypothesis if said probability is not greater than said threshold.

6. An apparatus for recognizing a color coded character, wherein said character comprises plural pixels which are of a first color, said first color pixels being predominate so as to allow humans to distinguish said character and a small amount of a second color associated with said character, said second color being non-predominate so as to be non-distracting to humans, but distinguishable by a color scanner, comprising:

a first means for processing said character by an optical character recognition means selected from an optical character recognition group consisting of geometric optical character recognition and non-predominate color coded optical character recognition; and a second means for processing said character by an optical character recognition means from said optical character recognition group not selected in said first processing step.

7. The apparatus of claim 6, wherein said first means further comprises:

means for generating a null hypothesis that a character is recognized and an alternative hypothesis that said character is not recognized, and wherein said second means further comprises:

means for selecting one hypothesis from a hypothesis group consisting of said null hypothesis and said alternative hypothesis.

8. The apparatus of claim 7, wherein said means for selecting one hypothesis from a hypothesis group consisting of said null hypothesis and said alternative hypothesis, further comprises:

means for calculating, by said optical character recognition means from said optical character recognition group not selected in said first means, a probability of a hypothesis from said hypothesis group; and means for selecting one hypothesis from said hypothesis group consisting of said null hypothesis and said alternative hypothesis based on said probability.

9. The apparatus of claim 8, wherein said means for selecting a hypothesis from said hypothesis group consisting of said null hypothesis and said alternative hypothesis based on said probability, further comprises:

means for selecting said alternative hypothesis if said probability is greater than a threshold; and means for selecting said null hypothesis if said probability is not greater than said threshold.

10. The apparatus of claim 8, wherein said means for selecting a hypothesis from said hypothesis group consisting of said null hypothesis and said alternative hypothesis based on said probability, further comprises:

means for selecting said null hypothesis if said probability is greater than a threshold; and means for selecting said alternative hypothesis if said probability is not greater than said threshold.

11. A method of permitting the recognition of a color coded character, wherein said character comprises plural pixels which are of a first color, said first color pixels being predominate so as to allow humans to distinguish said character and a small amount of a second color associated with said character, said second color being non-predominate so as to be non-distracting to humans, but distinguishable by a color scanner, comprising the steps of:

providing a first means for processing said character by an optical character recognition means selected from an optical character recognition group consisting of geometric optical character recognition and non-predominate color coded optical character recognition; and providing a second means for processing said character by an optical character recognition means from said optical character recognition group not selected in said first processing step.

12. The method of claim 11, wherein said step of providing a first means further comprises:

providing means for generating a null hypothesis that a character is recognized and an alternative hypothesis that said character is not recognized, and wherein said step of providing a second means further comprises:

providing means for selecting one hypothesis from a hypothesis group consisting of said null hypothesis and said alternative hypothesis.

13. The method of claim 12, wherein said step of providing means for selecting one hypothesis from a hypothesis group consisting of said null hypothesis and said alternative hypothesis, further comprises the steps of:

providing means for calculating, by said optical character recognition means from said optical character recognition group not selected in said first processing step, a probability of a hypothesis from said hypothesis group; and providing means for selecting one hypothesis from said hypothesis group consisting of said null hypothesis and said alternative hypothesis based on said probability.

14. The method of claim 13, wherein said step of providing means for selecting one hypothesis from said hypothesis group consisting of said null hypothesis and said alternative hypothesis based on said probability, further comprises the steps of:

providing means for selecting said alternative hypothesis if said probability is greater than a threshold; and providing means for selecting said null hypothesis if said probability is not greater than said threshold.

15. The method of claim 13, wherein said step of providing means for selecting one hypothesis from said hypothesis group consisting of said null hypothesis and said alternative hypothesis based on said probability, further comprises the steps of:

providing means for selecting said null hypothesis if said probability is greater than a threshold; and providing means for selecting said alternative hypothesis if said probability is not greater than said threshold.

\* \* \* \* \*